(12) United States Patent
Doll et al.

(10) Patent No.: US 9,953,010 B2
(45) Date of Patent: *Apr. 24, 2018

(54) TEMPLATE-BASED PAGE LAYOUT FOR HOSTED SOCIAL MAGAZINES

(71) Applicant: Flipboard, Inc., Palo Alto, CA (US)

(72) Inventors: Evan R. Doll, Palo Alto, CA (US); Marcos A. Weskamp, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/133,034

(22) Filed: Apr. 19, 2016

(65) Prior Publication Data

US 2016/0232134 A1 Aug. 11, 2016

Related U.S. Application Data

(63) Continuation of application No. 13/187,840, filed on Jul. 21, 2011, now Pat. No. 9,396,167.

(51) Int. Cl.
| | |
|---|---|
| *G06F 17/00* | (2006.01) |
| *G06F 17/21* | (2006.01) |
| *G06Q 50/00* | (2012.01) |
| *G06F 17/22* | (2006.01) |
| *G06F 17/24* | (2006.01) |

(52) U.S. Cl.
CPC ........ *G06F 17/212* (2013.01); *G06F 17/2247* (2013.01); *G06F 17/248* (2013.01); *G06Q 50/01* (2013.01)

(58) Field of Classification Search
None
See application file for complete search history.

(56) References Cited

U.S. PATENT DOCUMENTS

| | | |
|---|---|---|
| 5,870,683 A | 2/1999 | Wells |
| 5,895,477 A | 4/1999 | Orr et al. |
| 5,956,737 A | 9/1999 | King et al. |
| 6,173,286 B1 | 1/2001 | Guttman et al. |
| 6,499,041 B1 | 12/2002 | Breslau et al. |
| 6,771,801 B1 | 8/2004 | Fisher et al. |

(Continued)

OTHER PUBLICATIONS

PCT International Search Report and Written Opinion, PCT Application No. PCT/US2014/044979, dated Oct. 30, 2014, 9 pages.

(Continued)

*Primary Examiner* — Mustafa A Amin
(74) *Attorney, Agent, or Firm* — Fenwick & West LLP

(57) ABSTRACT

Page layout of content items from a variety of sources is performed. A content processing system queues content items, such as user-generated blogs, tweets, social networking status updates and other postings, received from a variety of sources. Each content item comprises one or more assets from one or more asset types. The asset types include text, images, and video. A page builder retrieves items from the queue and determines the item's size constraints. A template is selected from a template database to use as a layout for the items on a page; each template has a number of slots into which content can be placed. A layout module lays out the items into the slots of the selected template based on the respective size and aspect ratio constraints of the items, in order to build a page to serve to a client device.

20 Claims, 7 Drawing Sheets

(56) References Cited

U.S. PATENT DOCUMENTS

| | | |
|---|---|---|
| 6,826,727 B1 | 11/2004 | Mohr et al. |
| 7,028,255 B1 | 4/2006 | Ayers |
| 7,039,658 B2 | 5/2006 | Starkey |
| 7,246,311 B2 | 7/2007 | Bargeron |
| 7,272,789 B2 | 9/2007 | O'Brien |
| 7,472,340 B2 | 12/2008 | Burago |
| 7,500,188 B1 | 3/2009 | Trapani et al. |
| 7,617,449 B2 | 11/2009 | Carlson |
| 7,644,356 B2 | 1/2010 | Atkins |
| 7,747,947 B2 | 6/2010 | Balinsky |
| 7,814,116 B2 | 10/2010 | Hauser |
| 8,060,830 B2 | 11/2011 | Kahn et al. |
| 8,307,288 B1 | 11/2012 | Smaltz |
| 8,423,889 B1 | 4/2013 | Zagorie et al. |
| 8,612,851 B2 | 12/2013 | Kiefer et al. |
| 8,620,021 B2 | 12/2013 | Knudson et al. |
| 8,826,169 B1 | 9/2014 | Yacoub et al. |
| 9,053,190 B1 | 6/2015 | Boenau et al. |
| 9,070,158 B1 | 6/2015 | Parihar |
| 9,152,616 B2 | 10/2015 | Ying |
| 9,489,349 B2 | 11/2016 | Ying et al. |
| 9,558,175 B2 | 1/2017 | Makeev et al. |
| 2002/0059327 A1 | 5/2002 | Starkey |
| 2002/0076120 A1 | 6/2002 | Loce et al. |
| 2003/0237046 A1 | 12/2003 | Parker et al. |
| 2004/0078759 A1 | 4/2004 | Ohashi et al. |
| 2004/0252340 A1 | 12/2004 | Komagamine et al. |
| 2005/0039119 A1 | 2/2005 | Parks |
| 2005/0055635 A1 | 3/2005 | Bargeron et al. |
| 2005/0268227 A1 | 12/2005 | Carlson et al. |
| 2005/0268279 A1 | 12/2005 | Paulsen et al. |
| 2006/0107204 A1 | 5/2006 | Epstein |
| 2006/0143556 A1 | 6/2006 | Elkady |
| 2006/0168514 A1 | 7/2006 | Tokunaga |
| 2006/0279555 A1 | 12/2006 | Ono |
| 2006/0279566 A1 | 12/2006 | Atkins et al. |
| 2007/0079236 A1 | 4/2007 | Schrier et al. |
| 2007/0168859 A1 | 7/2007 | Fortes |
| 2007/0198915 A1 | 8/2007 | Hiyama |
| 2007/0214409 A1 | 9/2007 | Miyata |
| 2007/0255811 A1 | 11/2007 | Pettit et al. |
| 2007/0266328 A1 | 11/2007 | Vasey |
| 2007/0294238 A1 | 12/2007 | Citron et al. |
| 2008/0082903 A1 | 4/2008 | McCurdy et al. |
| 2008/0189609 A1 | 8/2008 | Larson et al. |
| 2009/0064003 A1 | 3/2009 | Harris et al. |
| 2009/0167768 A1 | 7/2009 | Bull |
| 2009/0249177 A1 | 10/2009 | Yamaji et al. |
| 2009/0265611 A1 | 10/2009 | Sengamedu |
| 2009/0307583 A1 | 12/2009 | Tonisson |
| 2009/0313538 A1 | 12/2009 | Kitada |
| 2010/0005380 A1 | 1/2010 | Lanahan et al. |
| 2010/0040286 A1 | 2/2010 | Matsuzawa |
| 2010/0083077 A1 | 4/2010 | Paulsen et al. |
| 2010/0115399 A1 | 5/2010 | Kohar et al. |
| 2010/0123908 A1 | 5/2010 | Denoue et al. |
| 2010/0325528 A1 | 12/2010 | Ramos |
| 2011/0047368 A1 | 2/2011 | Sundaramurthy et al. |
| 2011/0082749 A1 | 4/2011 | Rivlin et al. |
| 2011/0113041 A1* | 5/2011 | Hawthorne ....... G06F 17/30905 707/749 |
| 2011/0234613 A1 | 9/2011 | Hanson et al. |
| 2011/0246440 A1 | 10/2011 | Kocks et al. |
| 2011/0249903 A1 | 10/2011 | Duga |
| 2011/0276349 A1 | 11/2011 | Huang et al. |
| 2011/0283210 A1 | 11/2011 | Berger et al. |
| 2012/0036427 A1 | 2/2012 | Osaka et al. |
| 2012/0042240 A1 | 2/2012 | Oliveira et al. |
| 2012/0102095 A1 | 4/2012 | Campbell et al. |
| 2012/0159314 A1 | 6/2012 | Schrier et al. |
| 2012/0169741 A1 | 7/2012 | Adachi |
| 2012/0179780 A1 | 7/2012 | Spring et al. |
| 2012/0254713 A1 | 10/2012 | Roth et al. |
| 2012/0254733 A1 | 10/2012 | Tucovic |
| 2012/0294514 A1 | 11/2012 | Saunders et al. |
| 2013/0007586 A1 | 1/2013 | Thomas |
| 2013/0021377 A1 | 1/2013 | Doll |
| 2013/0024757 A1 | 1/2013 | Doll et al. |
| 2013/0124980 A1 | 5/2013 | Hudson et al. |
| 2013/0145259 A1 | 6/2013 | Kiefer et al. |
| 2013/0185632 A1 | 7/2013 | Damera-Venkata |
| 2013/0305144 A1 | 11/2013 | Jackson et al. |
| 2013/0339907 A1 | 12/2013 | Matas |
| 2014/0006406 A1 | 1/2014 | Kafati et al. |
| 2014/0075293 A1 | 3/2014 | Makeev et al. |
| 2014/0173396 A1 | 6/2014 | Imbruce et al. |
| 2014/0173405 A1 | 6/2014 | Ferrara et al. |
| 2014/0181646 A1 | 6/2014 | Rangwala et al. |
| 2014/0226901 A1 | 8/2014 | Spracklen |
| 2015/0151913 A1 | 6/2015 | Wong |

OTHER PUBLICATIONS

Learnlayout.com, "percent width", Learn CSS Layout, p. 1-2, captured by Internet Archive Wayback Machine Jan. 2, 2013, available at <URL:https://web.arch ive.org/web/20130102062605/http://learnlayout.com/percent.html>.

Anderson, C., et al.,"Web Montage: A Dynamic Personalized Start Page" WWW2002, May 7-11, 2002, Honolulu, Hawaii, USA, ACM, p. 1-14, can be retrieved at <URL:http://research.microsoft.com/en-us/um/people/horvitz/montage/montage-www.htm>.

Nguyen, Vinh-Tiep, et al, "Augmented Media for Traditional Magazines," SoICT'12: Information and Communication Technology, Aug. 2012, pp. 97-106.

Gibson, D. et al., "The Volume and Evolution of Web Page Templates," WWW 2005, May 10-14, 2005, pp. 830-839.

Office Action for U.S. Appl. No. 13/187,840, dated Sep. 23, 2015, 8 Pages.

Office Action for U.S. Appl. No. 13/187,840, dated Jun. 3, 2014, 23 Pages.

Office Action for U.S. Appl. No. 13/187,840, dated Oct. 18, 2013, 25 Pages.

Office Action for U.S. Appl. No. 13/187,840, dated Feb. 13, 2013, 23 Pages.

Extended European Search Report for European Patent Application No. EP 14822261.5, dated Mar. 6, 2017, 8 Pages.

* cited by examiner

Fig. 6A

TEMPLATE-BASED PAGE LAYOUT FOR HOSTED SOCIAL MAGAZINES

CROSS-REFERENCE TO RELATED APPLICATION

This application is a continuation of U.S. application Ser. No. 13/187,840, filed Jul. 21, 2011, which is incorporated by reference in its entirety.

BACKGROUND

1. Field of the Invention

This invention relates to laying out multiple pieces of content from multiple different sources on a common page for display on a computing device.

2. Description of the Related Art

Despite the proliferation of lightweight, portable computing devices, including smartphone and tablet computers, even the owners of these devices continue to consume media from traditional printed newspapers and magazines. Paper-based newspapers and magazines have been preferred because such publications use highly skilled page design experts to create aesthetically pleasing layouts of the content. Page design experts take advantage of the fact that printed newspapers and magazines come in a relatively limited number of standard page sizes. For example, most magazines are laid out on standard trimmed size of 8.5"×11". Standard page sizes are used in order to avoid costly custom cutting and fitting of the final printed document.

One of the problems with web content is that there is no concept of a standardized size or length for a web page. As a result, web pages frequently extend beyond the visible display area of display devices. In order to read the entire page, a user must repeatedly scroll down or across a web page in order to read it. This presentation experience is particularly frustrating to a user of device with a small screen, such as a smartphone and a tablet computer, since the user must spend considerable time scrolling back and forth or up and down to view the web page. This experience is entirely in contrast to paper-based newspapers and magazines that do not require, for example, horizontal scrolling to view blocks of text, or vertical scrolling to view embedded images—instead the user simply turns the page to continue experiencing the content.

The above challenges to presenting content on a portable computing device are exacerbated in context of a hosted social magazine. A hosted social magazine collects content from multiple sources, such as social media sites, news and information feeds, web sites, blogs, and so forth, and provides that content in a convenient assemblage for the user to read. Whereas a website or other publisher of content has complete editorial control over the layout of its content onto web pages and can use human page layout experts to design its pages, a hosted social magazine does not necessarily have such human-directed editorial control of each element of content.

SUMMARY

In various embodiments, the present invention performs page layout of items of content for social magazines and other pages that include content from a variety of sources. A content processing system receives content items, such as user-generated blogs, tweets, feeds, social networking status updates and other postings, from a variety of sources. Each content item comprises one or more assets. Each asset has an asset type, such as text, image or video. The assets included in each received item are identified by the content processing system and stored with the item in a queue. A page builder retrieves a number of content items from the queue and for each item, determines item's size constraints. Then, a template is selected from a template database to use as a layout for the items on a page; each template has a number of slots into which content can be placed. A layout module lays out the items into the slots of the selected template based on the respective size constraints of the items, in order to build a page to serve to a client device. This process is repeated until the page is complete. The items that were successfully placed on a page are removed from the queue. To build another page, the page builder retrieves the next items from the queue. The resulting pages are aesthetically pleasing, and each page fits into the available display area of a display device without requiring a user to scroll.

In one implementation, to determine the layout of the items on a page, the number of items ("cardinality") that will be placed on a page is selected. For example, a cardinality of seven means that the page is to have seven items laid out therein. A candidate template having the selected cardinality is selected. Then, for each item to be placed in the template, the item is attempted to be placed in an available slot of the template that meets the item's size constraints, until the item fits into one of the slots, or no slot is available that meets the item's size constraints. This process is iterated for each subsequent item until the template is completed and the page can be served, or it is determined that the template cannot be completed and another candidate template of the same cardinality is selected. If no other templates of the same cardinality are available, a different cardinality for a template is determined, and a candidate template having the new cardinality is selected. Then the process of attempting to place items in the candidate template is repeated.

In one embodiment, multiple candidate templates are filled using the same starting set of items. Each completed template is then scored, and the candidate template with the best score is selected for the final layout of the page. The score of a template is based on scores for each of the template's slots. A score for a template slot is calculated based on a difference between an ideal size for the placed item and the actual slot size.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 6A and 6B are example pages of a social magazine with items from a variety of sources laid out on a common page according to a template, in accordance with an embodiment.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Figure 1:
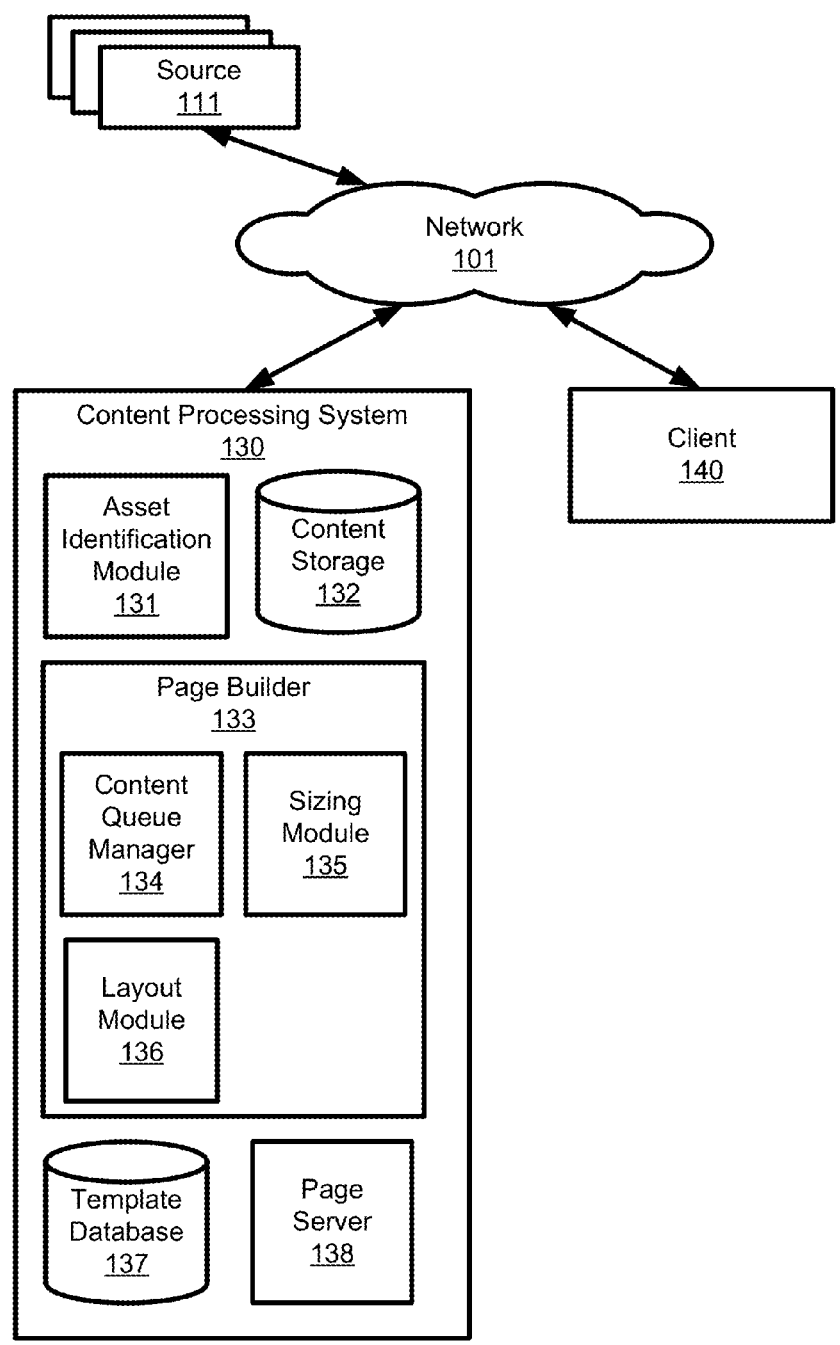
FIG. 1 is a high-level block diagram of a system environment in accordance with an embodiment of the invention.

Various systems and methods for template-based page layout of items of content for social magazines and other pages that include content from a variety of sources are now described in detail. Template-based page layout generates aesthetically pleasing layouts that enable a user to browse content items through a series of discrete pages, each of which fit into the available display area of a display device without requiring a user to scroll. FIG. 1 is a high-level block diagram of a system environment in accordance with one embodiment. The system environment includes a plurality of sources 111, a content processing system 130, and a client 140 connected via a network 101, such as the Internet.

The sources 111 comprise various sources of content such as text, images, video, or audio on web pages, web feeds, social networks, or other distribution platforms. The content may include user-generated content such as blogs, tweets, shared images, video or audio, and social networking posts and status updates. For convenience, content from a source, regardless of its composition, will be referred to herein as a "content item" or simply "content." Each content item comprises one or more assets, where each asset has an asset type. The asset types include text, images, and video.

The content processing system 130 receives content items from the sources 111, processes the content items to build pages according to page templates, and serves the pages to a client 140. The content processing system 130 includes an asset identification module 131, content storage 132, a page builder 133, a template database 137, and a page server 138. The content processing system 130 may be implemented using a single computer or a network of computers, including cloud-based computer implementations. The computers may be server class computers including one or more CPUs, main memory, as well as computer readable, persistent storage, and running an operating system. Operation of the content processing system 130 as described herein can be controlled through either hardware or through computer programs installed in computer storage and executed by processors of computers to perform the functions described herein. The content processing system 130 includes other hardware elements for performing the operations described here, including network interfaces, networking devices (e.g., routers, firewalls) and protocols, input devices for data entry, and output devices for display, printing, or other presentations of data, which are not shown so as to not obscure the relevant details of the system.

The asset identification module 131 of the content processing system 130 is configured to identify the assets that make up each content item, and is one means for performing this function. As mentioned above, each content item comprises one or more assets from one or more asset types, including text, images, and video.

The content storage 132 of the content processing system 130 is configured to store the content items received along with the identification of the assets types that make up each content item, and is one means for performing this function. Optionally, the content storage 132 can also store other metadata about the content item, such as the source of the content item, a time indicator for when the content item was originally posted at a source, a time indicator for when the content item was received by the content processing system 130, or the like. Time indicators in particular may be useful in establishing a queue of content items in content storage 132 that sets out an approximate order in which to try to place content items on pages.

The page builder 133 of the content processing system 130 is configured to build pages that include the content items from content storage 132, and is one means for performing this function. The page builder 133 includes a content queue manager 134, a sizing module 135, and a layout module 136.

The content queue manager 134 is configured to manage a queue of content items in content storage 132, and is one means for performing this function. The queue represents an approximate order in which the page builder 133 will try to place the content items on pages. The content queue manager 134 may build the queue with reference to the order in which content items were received by the content processing system 130, for example using a first-in-first-out (FIFO) or a last-in-first-out (LIFO) queue management paradigm.

When building a page, the content queue manager 134 accesses the next item in the queue from content storage 132, and passes it to the sizing module 135. The sizing module 135 determines the size constraints for each content item, such as the preferred size or sizes of each content item.

The layout module 136 of the page builder 133 is configured to lay out pages according to page templates selected from the template database 137, based on the size constraints of the content items determined by the sizing module 135, and is one means for performing this function. The templates allow content items from a variety of sources to be laid out on a common page in a manner that presents a visually aesthetically appealing design. Templates that contribute to a visually appealing design accommodate a variety of sizes of content items, include on the order of three to seven content items per page, and are sized appropriately for the display device of the client 140 to avoid horizontal or vertical scrolling. Examples of templates from the template database 137 are described in more detail below, with reference FIG. 2. The operation of the layout module 136 will be described in more detail below, with reference to FIGS. 4-5.

The page server 138 is configured to receive the pages completed by the page builder 133, and serve the completed pages to a client 140 via the network 101, and is one means for performing this function.

The client 140 can be any computing device equipped with a browser for accessing web pages and a display for viewing them, such as a personal computer, a tablet computer, or a mobile device. The client 140 receives the formatted page and displays it to the user. While only a single client 140 is shown in FIG. 1, in practice there may be thousands, or even millions of clients 140 in communication with the system 130.

Thus, from the viewpoint of a user of the client 140, a variety of content items from a variety of sources 111 are automatically rendered in a page layout appropriate for the user's enjoyment on the client 140. Accordingly, the user can achieve a magazine-like reading experience of the variety of content items from a variety of sources without the inconvenience of horizontal or vertical scrolling to see other items on the page.

Page Templates

Figure 2:
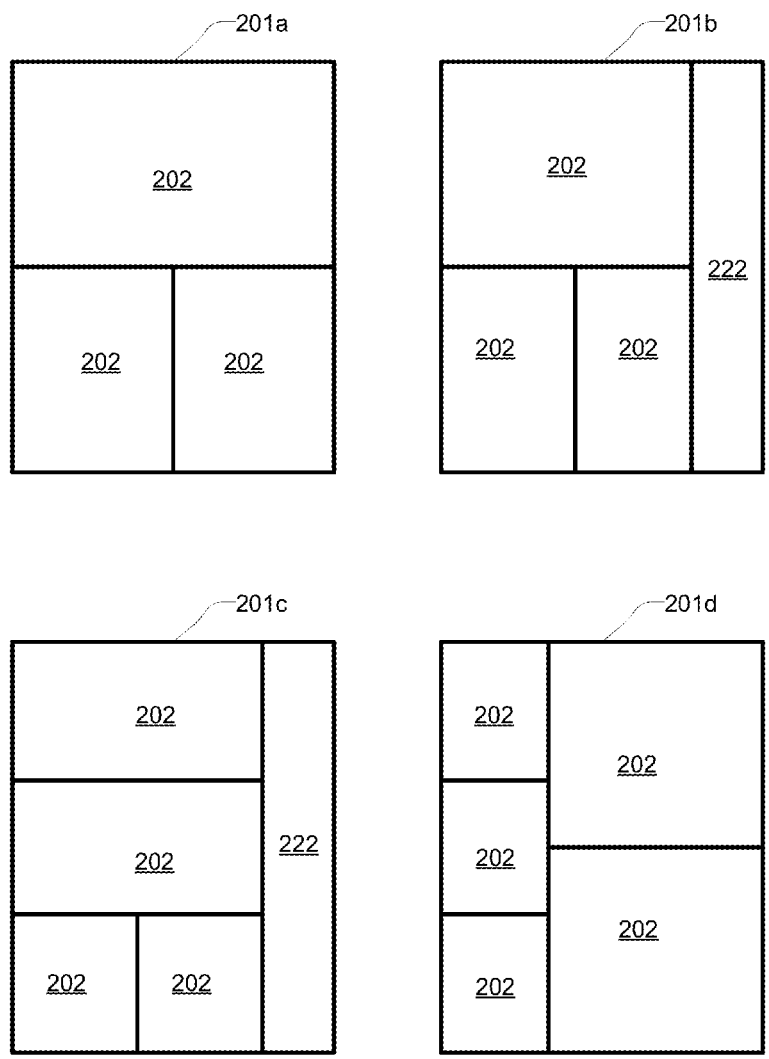
FIG. 2 illustrates four example templates of a set of templates, each having a different layout of slots for items, in accordance with an embodiment.

A page template describes a spatial arrangement ("layout") by which content items are arranged on page for presentation on a display device. A template is comprised of slots, wherein each slot will hold one content item. Each slot has a size (e.g., small, medium, or large) and an aspect ratio. FIG. 2 illustrates four example page templates 201a-201d of a set of templates, each having a different set of slots 202 for content items from sources 111, in accordance with an embodiment. These templates are examples of the templates that may be included in the template database 137 of the content processing system 130. In practice, any number of templates can be used, providing a useful variety of different page layouts. The templates may be defined, for example, in JSON format, and be designed by a human with aesthetic sensibilities, rather than being designed by an automatic algorithm. The templates in the template database 137 may share characteristics that make each of them appropriate for use in laying out content for display on the client 140, such as overall dimensions, and dimensions of slots. The templates may be client-device specific. For example, a set of templates stored in a template database 137 may be designed for an iPad® tablet computer from Apple Inc., of Cupertino, Calif., to have dimensions such that when content items are displayed according to any of the templates in the set on that device, the content is presented as a single readable page, without the need for scrolling. More generally, a set of templates can be created for each of a plurality of display device sizes, and the appropriate set used when laying out a page for a specific type of device. Generally, templates in the template database 137 are reusable for various content items across various sources 111 for efficiency. For example, the template database 137 may contain on the order of one hundred templates, which provide a visual variety of layouts having slots for a variety of different numbers of content items.

The example page templates 201a-201d shown in FIG. 2 illustrate various combinations of slots 202 of various sizes and aspect ratios. In this example, each slot 202 is rectangular, and each slot holds space for one content item. Other templates having other combinations of slots are also present in the template database 137. The templates 201 can be organized according to the number of slots 202 they have, referred to as the "cardinality" of the template. In the examples shown in FIG. 2, template 201a has a cardinality of three, template 201b has a cardinality of four, and templates 201c and 201d each have a cardinality of 5. The template database 137 will typically store between five and thirty templates of each cardinality. In one embodiment, templates have cardinalities ranging from three to seven, inclusive.

In some implementations, certain slots of some templates in the template database 137 are reserved for particular types of content items. For example, some slots in some templates may be reserved for items containing images. As another example, a plurality of social network status updates may be commonly grouped together and displayed in a list as a single content item, for example in the long vertical slot 222 along the right side of templates 201b and 201c. By grouping short content items into a single slot 222, the layout may appear more visually appealing by avoiding excessive choppiness, and allowing the reader's eye to flow down the page.

Selecting and Using Page Templates

Figure 3:
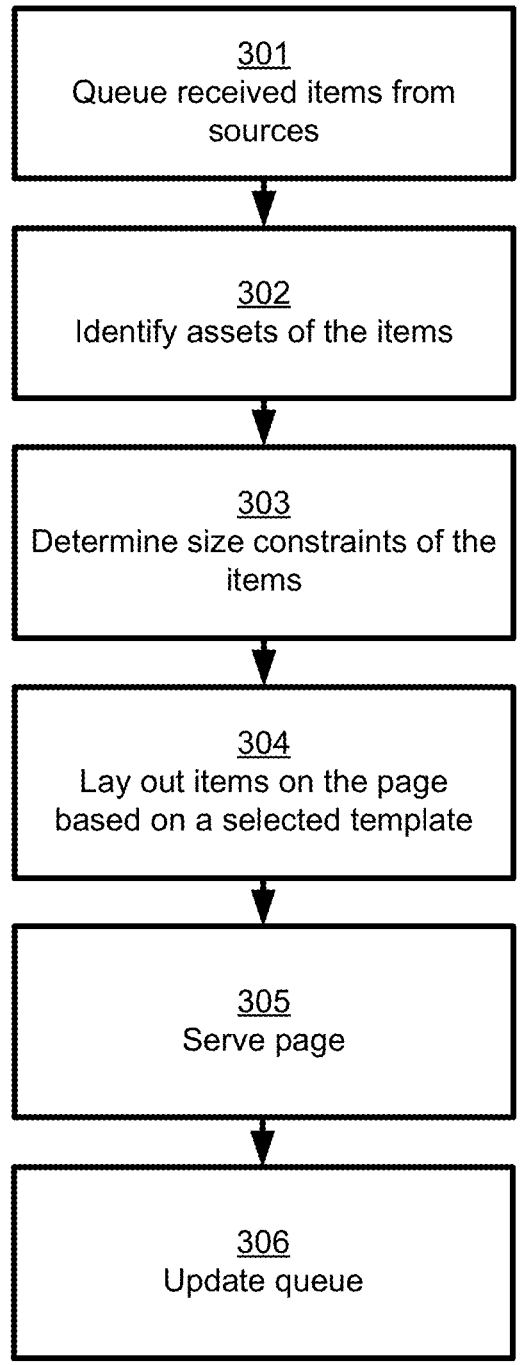
FIG. 3 is a flow chart illustrating a method serving a page of items that have been laid out based on a selected template, in accordance with an embodiment.

FIG. 3 is a flow chart illustrating a method of generating a page of items that have been laid out based on a selected template, in accordance with an embodiment. This method may be implemented, for example, by the content processing system 130 illustrated in FIG. 1. The method may be performed using a different sequence or combination of steps than illustrated here, and may be performed concurrently in multiple threads.

In this example, the content processing system 130 queues 301 a plurality of content items that are received from sources 111. The queue establishes an approximate order in which the content processing system 130 will attempt to place content items on pages. The queue may be established at least in part based on the time that each content item was received by the content processing system 130. The queue may fluctuate in depth, but generally contains at least as many content items as needed to complete the layout of a page, and often contains enough content items to fill several pages in rapid succession. The system 130 can have a single queue of content items, or multiple different queues. In one embodiment, a separate queue is maintained for each user having an account with the system. The user's queue is populated with content items specifically of interest to that user, such as content items from various sources selected by the user.

The assets of the received content items are identified 302 by the asset identification module 131 of the content processing system 130. The identified assets of each of the content items may be stored in content storage 132. For example, given a web page, the asset identification module 131 can read the document object model for the page, and from there identify individual text, image, video, graphic, or other assets. The asset identification module 131 need not store all assets of a content item, but may select only particular types of assets, such as only text and images, for storage in the content storage 132.

The size constraints of each of the received content items are determined 303, for example, by the sizing module 135. The size options for items may be specified in categories, such as small, medium, and large, based on their actual dimensions, and the preferred size for one item may be one or more than one of those size options. As another example, the size options may be expressed in number of pixels, dimensions of bounding boxes, or the like. In these cases, the sizing module 135 may determine the preferred size of each content item in terms of a minimum and maximum size. In some cases, the size options for items may be specific to the asset type(s) of the content item; thus text assets may comprise one set of respective dimensions for small, medium, and large items, whereas image assets may have another set of respective dimensions for small, medium, and large images In cases where a content item has both text and image assets, in one embodiment, whatever asset type consumes more space is used to control the allowable size options for the content item as a whole. For example, for a text asset, the sizing module 135 may determine the number of characters, whereas for an image asset, the sizing module 135 may determine the number of pixels, the aspect ratio, and the smallest allowable dimension. For image assets in particular, the sizing module 135 may also determine a preferred aspect ratio in terms of a minimum and maximum. For example, an image asset may have an original aspect ratio of 3:4, and preferred aspect ratio constraints of 3:3 and 3:4.5.

After the size constraints of the items are determined 303, the items are laid out 304 on a page based on a selected template. The layout of the page may be implemented by the layout module 136 of the page builder 133 of the content processing system 130. The operation of the layout module 136 will be described in greater detail below with reference to FIG. 4-5.

The completed layout of the page is served 305 to the client 140, for example by the page server 138 of the content processing system 130. In one implementation, any content items in the queue that were not accommodated on the served page remain in the queue for potential placement on the next page. The queue is updated 306 to delete the content items that were included on the served page, for example by the content queue manager 134. Thus, the content processing system 130 is prepared to build another page with content items that have not yet been placed on a served page.

Figure 4:
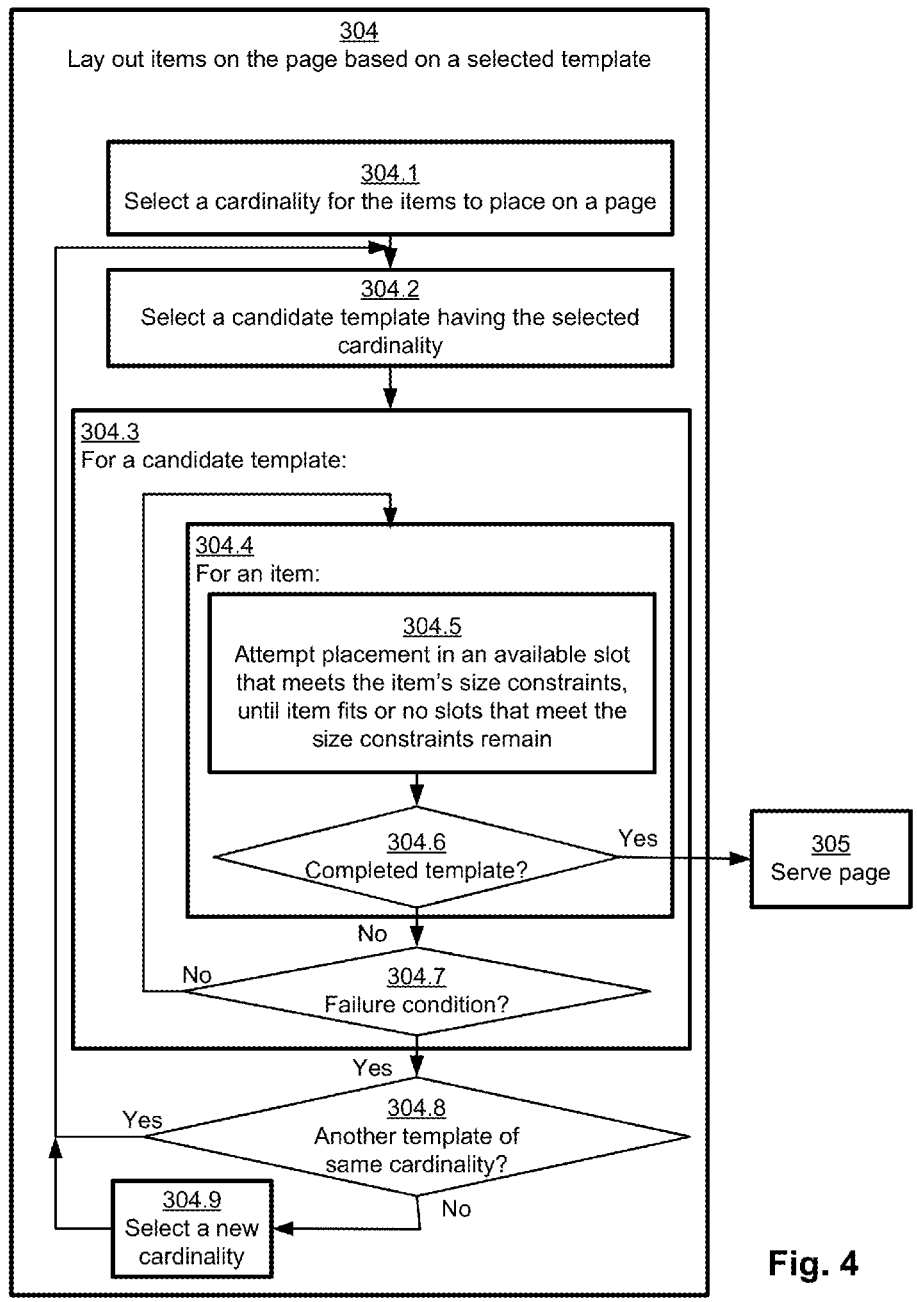
FIG. 4 is a flow chart illustrating a method of laying out items on a page based on a selected template, in accordance with an embodiment.

FIG. 4 is a flow chart illustrating a method of laying out items on a page based on a selected template, in accordance with an embodiment. This method may be implemented, for example, by a layout module 136 of the content processing system 130. Specifically, this diagram illustrates one implementation of step 304 of FIG. 3, and other implementations may use a different arrangement of steps to provide the same result.

In the implementation illustrated in FIG. 4, a cardinality for the items to place on a page is selected 304.1 ("current cardinality"). The cardinalities correspond to the number of slots that a template has for content items. Generally, the numbers of slots vary from three to seven, but fewer or more slots are also possible. In one implementation, the selection of the cardinality for the items to place on a page proceeds according to the cardinality sequence {5, 3, 4, 7, 6}, but in other implementations other orders of cardinalities can be established.

Next, a candidate template is selected 304.2 for the current cardinality. For example, if the current cardinality is three, then one of the templates from the group of three-slot templates is selected as a candidate template. The selection of the candidate template from the group of the same cardinality may be performed in a manner to prevent any single template from being used too frequently, for example by selecting the starting candidate template randomly or by selecting the starting candidate template to be the one least frequently used.

For the selected candidate template 304.3, and for a content item 304.4 from the content item queue, the layout module 136 attempts 304.5 to place the content item in an available slot of the candidate template that meets the item's size constraints. As noted above, the item's size and aspect ratio constraints are based on the type of the item, such as text, image or video, as well as attributes of the content such as the amount of text or size of the image. Given the size and aspect ratio constraints, an attempt is made to match the item with the available slots in the template.

The placement 304.5 is attempted for the item until a slot is found into which the content item fits, or there is no available slot that meets the size constraints of the content item. If the content item fits in a slot of the candidate template, the item is temporarily left in the slot until it is determined whether the layout can be successfully completed using the candidate template. If the content item does not fit in any of the slots of the candidate template, the content item is returned to the queue, for example, at a position in the queue to be placed on the next page that is built, or a subsequent page.

After the attempted placement 304.5 of a content item, the layout module 136 determines whether the candidate template has been completed 304.6 by checking if all the candidate template's slots have been filled. If so, the page can be served 305. If not, then the layout module 136 determines 304.7 whether a failure condition exists for the candidate template. A failure condition indicates that a page cannot be constructed given the currently selected template and the available content items in the queue. An example failure condition is that the number of empty slots of the candidate template exceeds the number of remaining content items to be placed, thus signaling that the candidate template will not be able to be completed with the remaining content items.

If a failure condition does not exist, then the process 304.4-304.7 iterates for the next content item. In one implementation, if a failure condition is reached, any content items that were temporarily placed in slots of candidate template are returned to the queue for potential placement in the new candidate template.

If a failure condition exists, then the layout module 136 determines 304.8 whether another template of the current cardinality is available to be selected as a candidate template. If another template of the current cardinality is available, then the process returns to selecting 304.2 the next candidate template of the same cardinality.

Once all of the candidate templates of a particular cardinality have already been tried without success, then a new cardinality is selected 304.9, and the process begins again with selecting 304.2 a candidate template having the new selected cardinality. Thus, for example, if the first selected cardinality is five, and all the candidate templates with a cardinality of five fail, then a cardinality of three may be selected, and the process will proceed by testing candidate templates having a cardinality of three. If all of the candidate templates with a cardinality of three fail, then a cardinality of four may be selected, and so on, until a candidate template is completed and can be served 305.

Figure 5:
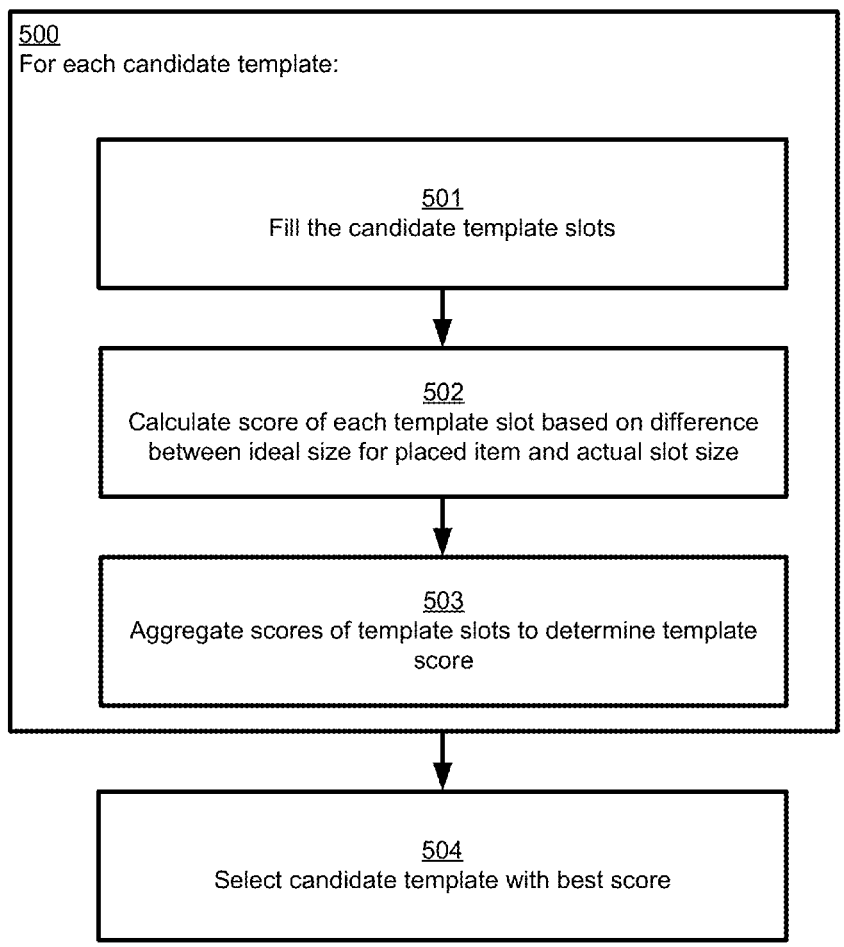
FIG. 5 is a flow chart illustrating a method of scoring candidate templates, in accordance with an embodiment.

Thus, the layout module 136 of the content processing system 130 can use the example method in FIG. 4 to layout content items on a page based on a selected template. In one embodiment, instead of serving 305 the page of content items using the first successfully filled template, multiple candidate templates are filled using the same starting set of items, creating multiple templates. For example, given a set of items, there may be five 3-slot templates, six 4-slot templates, four 5-slot templates, and two 7-slot templates are successfully filled, for a total of 17 candidate templates for the page. Each of the candidate templates is then scored and the candidate with the best score is selected for the final layout of the page. FIG. 5 is a flow chart illustrating an example method of scoring candidate templates for this purpose.

For each candidate template 500, the candidate template's slots are filled 501 using a set of content items from the queue; each template may be filled with the same set of content items from the queue, or a different set of items. The candidate template's slots can be filled by the layout module 136 of the content processing system 130, for example, by placing content items into available slots that meet the content item's size constraints, similarly to the technique described above with reference to FIG. 4.

Then, the score of each template slot can be calculated 502 based on a difference between an ideal size for the content item and the actual slot size into which the content items is placed. A slot receives a maximum score if the ideal size of the content item matches the actual size of the slot (either identically or within some small threshold difference), and a minimum score if the size difference exceed some maximum amount. In other implementations, any comparison technique can be used to determine how well the content item fits in the slot where it has been placed, such as the degree of resizing needed to make the content item fit, and/or the difference between an original aspect ratio of an image and the aspect ratio of the slot.

To determine the overall template score, the scores of all the template slots are aggregated 503. The aggregated score may simply be the sum of all the scores of the slots, or the scores may be weighted in the combination, for example to reflect the relative importance of how well a content item fits the largest slot on the page, or the importance of how well content items that include images fit slots on the page, to the overall look and feel of the page layout. The scores can also be normalized for the number of slots on page, so that pages with more slots are not favored over pages with fewer slots. For example, on a three slot page, each slot can be given a maximum of 0.333, prior to weighting (minimum at 0.0), whereas on five slot page, each slot can be given a maximum of 0.200 (minimum at 0.0), prior to weighting. Weighing of slots within a template can be done to redistribute the maximum slot scores, so long as the total template score remains constant, thus allowing templates with different cardinality to be directly compared. For example, in a three slot template, the maximum slot scores can be weighted to give prominence to the fit of an image slot relative to two text slots by weighting the image slot so that its maximum score is 0.50 and weighting the text slots with so that their maximum scores is 0.25. A randomization can also be applied in order to avoid repeated use of the same template.

Finally, the candidate template with the best score is selected 504. The page is built, for example by the page builder 133 of the content processing system 130, based on the layout of the selected template.

Figure 6B:
Figure 6B:
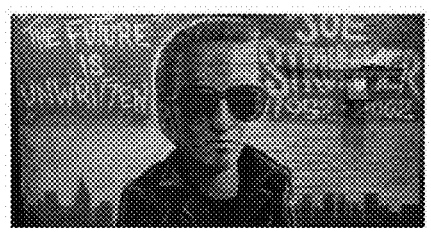
Figure 6B:
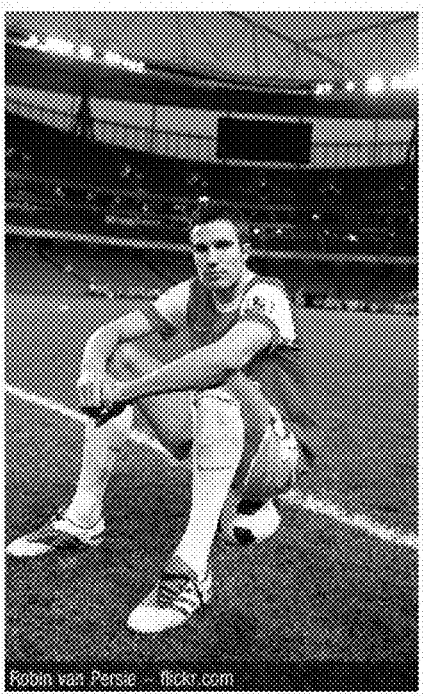

FIGS. 6A and 6B are example pages of a social magazine with items from a variety of sources laid out on a common page according to a template, in accordance with an embodiment. The layouts illustrated in FIGS. 6A and 6B represent finished products of the methods illustrated in FIGS. 3-5.

Additional Configuration Considerations

The present invention has been described in particular detail with respect to several possible embodiments. Those of skill in the art will appreciate that the invention may be practiced in other embodiments. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for presenting content items comprising:
   receiving a plurality of content items;
   determining size constraints of each of the plurality of content items;
   selecting a plurality of candidate templates each having a number of slots, each slot defining a portion of a page within which a content item is displayed;
   for each candidate template of the plurality of candidate templates, determining a score for the candidate template by:
   determining a score for each slot of the candidate template based on a difference between a size of the slot of the candidate template and the size constraints of one or more of the plurality of content items, where a minimum score is assigned to the slot if the size difference between the size of the slot and size constraints of the content item exceeds a threshold difference, and determining the score for the candidate template based on aggregating the scores of the slots of the candidate template;

selecting a template from the plurality of candidate templates based on the determined scores; and generating the page for presentation to a user, the page including one or more of the plurality of content items positioned based on slots in the selected template.

2. The method of claim 1, wherein one or more of the plurality of content items comprise user-generated posts on social networks.

3. The method of claim 1, wherein each of the plurality of content items have an asset type selected from a group consisting of text and image.

4. The method of claim 3, wherein the difference between the size of the slot of the candidate template and the size constraints of one or more of the plurality of content items is based on an aspect ratio of the slot in the candidate template and a minimum or a maximum aspect ratio of content items with having an asset type of image.

5. The method of claim 1, wherein the difference between the size of the slot of the candidate template and the size constraints of one or more of the plurality of content items is based on a degree of resizing applied to a content item of the plurality of content items to present the content item in the slot of the candidate template.

6. The method of claim 1, wherein determining the score for the candidate template based on aggregating the scores of the slots of the candidate template comprises:

weighting the scores for each slot in the candidate template; and aggregating the weighted scores for each slot in the candidate template.

7. The method of claim 1, wherein all of the plurality of candidate templates have a same number of slots.

8. The method of claim 1, wherein aggregating the scores of the slots of the candidate template comprises normalizing the aggregated score for the candidate template according to the number of slots for the candidate template.

9. A method for presenting content items comprising:

receiving a plurality of content items;

determining size constraints of each of the plurality of content items;

selecting a plurality of candidate templates each having a number of slots, each slot defining a portion of a page within which a content item is displayed;

for each candidate template of the plurality of candidate templates, determining a score for the candidate template by:

determining a score for each slot of the candidate template based on a degree of resizing needed to fit one or more of the plurality of content items into the slot, where a minimum score is assigned to a slot if greater than a threshold degree of resizing is needed to fit a content item of the plurality of content items into the slot, and determining the score for the candidate template based on aggregating the scores of the slots of the candidate template;

selecting a template from the plurality of candidate templates based on the determined scores; and generating the page for presentation to a user, the page including one or more of the plurality of content items positioned based on slots in the selected template.

10. The method of claim 9, wherein one or more of the plurality of content items comprise user-generated posts on social networks.

11. The method of claim 9, wherein each of the plurality of content items have an asset type selected from a group consisting of text and image.

12. The method of claim 11, wherein the degree of resizing needed to fit one or more of the plurality of content items into the slot is based on a difference between an original aspect ratio of a content item having asset type of image and the aspect ratio of the slot.

13. The method of claim 9, wherein all of the plurality of candidate templates have a same number of slots.

14. The method of claim 9, wherein aggregating the scores of the slots of the candidate template comprises normalizing the aggregated score for the candidate template according to the number of slots for the candidate template.

15. A computer program product comprising a non-transitory computer-readable storage medium having instructions encoded thereon that, when executed by a processor, cause the processor to:

receive a plurality of content items;

determine size constraints of each of the plurality of content items;

select a plurality of candidate templates each having a number of slots, each slot defining a portion of a page within which a content item is displayed;

for each candidate template of the plurality of candidate templates, determine a score for the candidate template by:

determining a score for each slot of the candidate template based on a difference between a size of the slot of the candidate template and the size constraints of one or more of the plurality of content items, where a minimum score is assigned to the slot if the size difference between the size of the slot and size constraints of the content item exceeds a threshold difference, and determining the score for the candidate template based on aggregating the scores of the slots of the candidate template;

select a template from the plurality of candidate templates based on the determined scores; and generate the page for presentation to a user, the page including one or more of the plurality of content items positioned based on slots in the selected template.

16. The computer program product of claim 15, wherein each of the plurality of content items have an asset type selected from a group consisting of text and image.

17. The computer program product of claim 16, wherein the difference between the size of the slot of the candidate template and the size constraints of one or more of the plurality of content items is based on an aspect ratio of the slot in the candidate template and a minimum or a maximum aspect ratio of content items with having an asset type of image.

18. The computer program product of claim 15, wherein the difference between the size of the slot of the candidate template and the size constraints of one or more of the plurality of content items is based on a degree of resizing applied to a content item of the plurality of content items to present the content item in the slot of the candidate template.

19. The computer program product of claim 15, wherein determining the score for the candidate template based on aggregating the scores of the slots of the candidate template comprises:
    weighting the scores for each slot in the candidate template; and
    aggregating the weighted scores for each slot in the candidate template.

20. The computer program product of claim 15, wherein aggregating the scores of the slots of the candidate template comprises normalizing the aggregated score for the candidate template according to the number of slots for the candidate template.

* * * * *

UNITED STATES PATENT AND TRADEMARK OFFICE
CERTIFICATE OF CORRECTION

PATENT NO. : 9,953,010 B2
APPLICATION NO. : 15/133034
DATED : April 24, 2018
INVENTOR(S) : Evan R. Doll and Marcos A. Weskamp Page 1 of 1

It is certified that error appears in the above-identified patent and that said Letters Patent is hereby corrected as shown below:

In the Claims

Column 11, Line 14, after "based on" insert -- the --
Column 11, Line 26, after "with having" delete "an"
Column 12, Line 21, after "score for the candidate" delete "for" and insert -- of --
Column 12, Line 60, after "content items" delete "with"

Signed and Sealed this
Twentieth Day of November, 2018

Andrei Iancu
*Director of the United States Patent and Trademark Office*